US010409436B2

(12) United States Patent
Hock

(10) Patent No.: US 10,409,436 B2
(45) Date of Patent: Sep. 10, 2019

(54) GRAPHICAL USER INTERFACE FOR QUALIFYING NAVIGATIONS THROUGH RELATIONAL DATA MODELS

(71) Applicant: SuccessFactors, Inc., South San Francisco, CA (US)

(72) Inventor: David Joseph Hock, Poway, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 475 days.

(21) Appl. No.: 14/970,020

(22) Filed: Dec. 15, 2015

(65) Prior Publication Data

US 2017/0168665 A1 Jun. 15, 2017

(51) Int. Cl.
| | | |
|---|---|---|
| *G06F 17/30* | (2006.01) | |
| *G06F 17/00* | (2019.01) | |
| *G06F 15/16* | (2006.01) | |
| *G06F 3/048* | (2013.01) | |
| *G06F 16/25* | (2019.01) | |
| *G06F 16/28* | (2019.01) | |

(52) U.S. Cl.
CPC ............ *G06F 3/048* (2013.01); *G06F 16/254* (2019.01); *G06F 16/25* (2019.01); *G06F 16/258* (2019.01); *G06F 16/282* (2019.01); Y10S 707/99943 (2013.01)

(58) Field of Classification Search
CPC .. G01C 21/3423; G06Q 10/02; G06Q 10/047; G06F 16/282; G06F 16/25; G06F 16/258; Y10S 707/99943
See application file for complete search history.

(56) References Cited

U.S. PATENT DOCUMENTS

| | | | |
|---|---|---|---|
| 5,418,950 A | 5/1995 | Li et al. | |
| 6,137,488 A | 10/2000 | Kraft et al. | |
| 7,185,317 B2 | 2/2007 | Fish et al. | |
| 7,844,587 B2 | 11/2010 | Blakely et al. | |
| 8,117,327 B2 * | 2/2012 | Carroll | H04L 29/06 709/230 |
| 8,219,523 B2 | 7/2012 | Harush | |
| 8,414,513 B1 * | 4/2013 | Earle | A61F 5/042 602/32 |
| 8,675,683 B2 * | 3/2014 | Valk | H04L 47/39 370/473 |
| 9,460,415 B2 | 10/2016 | Brunswig et al. | |

(Continued)

OTHER PUBLICATIONS

Susan Traynor, Worklogix Whitepaper—Harnessing the Power of SAP Query in SAP HCM part II, Published Sep. 15, 2014, 83 pages.

*Primary Examiner* — Jordany Nunez
(74) *Attorney, Agent, or Firm* — Fountainhead Law Group P.C.

(57) ABSTRACT

Some embodiments provide a non-transitory machine-readable medium that stores a program executable by at least one processing unit of a device. The program receives a selection of a navigation route through a relational data model. The relational data model includes several entities and a set of relationships among the several entities. The program also provides, through a graphical user interface (GUI), a tool for qualifying an attribute associated with an entity in the selected navigation route. The program further receives a selection of a value for the attribute associated with the entity in the navigation route for a data integration operation.

20 Claims, 7 Drawing Sheets

(56) References Cited

U.S. PATENT DOCUMENTS

| | | | |
|---|---|---|---|
| 2004/0176967 A1* | 9/2004 | Whittenberger | G06Q 10/10 715/764 |
| 2004/0193579 A1 | 9/2004 | Dettinger et al. | |
| 2006/0106776 A1 | 5/2006 | Dettinger et al. | |
| 2006/0155689 A1 | 7/2006 | Blakely et al. | |
| 2006/0161521 A1 | 7/2006 | Dettinger et al. | |
| 2006/0161533 A1 | 7/2006 | Selca et al. | |
| 2006/0287987 A1 | 12/2006 | McGeachie et al. | |
| 2007/0078729 A1* | 4/2007 | Brown | G06Q 10/02 705/5 |
| 2007/0124066 A1* | 5/2007 | Kikuchi | G01C 21/3415 701/533 |
| 2008/0016253 A1 | 1/2008 | Boctor | |
| 2008/0082521 A1 | 4/2008 | Danielson et al. | |
| 2008/0104542 A1 | 5/2008 | Cohen et al. | |
| 2009/0125830 A1 | 5/2009 | Marcek et al. | |
| 2009/0319544 A1* | 12/2009 | Griffin | G06F 16/254 |
| 2010/0161101 A1 | 6/2010 | Pouyez et al. | |
| 2010/0228574 A1* | 9/2010 | Mundinger | G06Q 10/047 705/4 |
| 2011/0035744 A1 | 2/2011 | Bhatia | |
| 2011/0078569 A1 | 3/2011 | Lorch et al. | |
| 2011/0153575 A1 | 6/2011 | Glasser et al. | |
| 2012/0166459 A1 | 6/2012 | Ritter et al. | |
| 2012/0159392 A1 | 10/2012 | Kauerauf | |
| 2012/0254201 A1 | 10/2012 | Cochrane et al. | |
| 2013/0166550 A1 | 6/2013 | Buchmann et al. | |
| 2013/0254145 A1* | 9/2013 | Salisbury | G06F 9/466 706/21 |
| 2013/0304531 A1 | 11/2013 | Barber et al. | |
| 2015/0074140 A1 | 3/2015 | Hutzel et al. | |
| 2015/0154269 A1 | 6/2015 | Miller et al. | |
| 2015/0286720 A1 | 10/2015 | Walsh et al. | |
| 2016/0034526 A1 | 2/2016 | Pringuey et al. | |
| 2017/0078094 A1 | 3/2017 | Olson | |
| 2017/0168665 A1 | 6/2017 | Hock | |
| 2017/0169099 A1 | 6/2017 | Hock et al. | |

* cited by examiner

GRAPHICAL USER INTERFACE FOR QUALIFYING NAVIGATIONS THROUGH RELATIONAL DATA MODELS

BACKGROUND

Computing systems (e.g., enterprise systems) may be used for managing large amounts of data. Different computing systems may manage data using different techniques. For instance, some computing systems store data based on to a relational data model. In such a model, data is organized and/or stored according to defined entities and relationships among the entities.

In some instances, a computing system may export data to another computing system (e.g., a third-party system). For complex relational data models that have a large number of entities and/or relationships, identifying the desired data to export to another computing system may be difficult and/or time consuming. For example, a user of the computing system may need to manually traverse through the relational data model in order to identify the desired data.

When a computing system exports data to another computing system, the other computing system may expect data that is not directly available from the attributes of an entity. For example, the other computing system may require data that includes street, city, state, and zip code in a single string while the computing system may store the street, city, state, and zip code as separate attributes of an entity. In such an example, the computing system may aggregate the attributes into a single string before exporting the data to the other computing system.

SUMMARY

In some embodiments, a non-transitory machine-readable medium stores a program executable by at least one processing unit of a device. The program receives a selection of a navigation route through a relational data model. The relational data model includes several entities and a set of relationships among the several entities. The program also provides, through a graphical user interface (GUI), a tool for qualifying an attribute associated with an entity in the selected navigation route. The program further receives a selection of a value for the attribute associated with the entity in the navigation route for a data integration operation. In some embodiments, the program provides, through the GUI, a selectable UI item for invoking the tool for qualifying the attribute associated with the entity in the selected navigation route. The selectable UI item may be provided in response to receiving the selection of the navigation route. The attribute associated with the entity may be a first attribute associated with a first entity and the selectable UI item may be a first selectable UI item. In some embodiments, the program provides, through the GUI, a second selectable UI item for invoking the tool for qualifying a second attribute associated with a second entity in the selected navigation route.

In some embodiments, the program also performs the data integration operation on a system based on the selected navigation route and the selected value for the attribute associated with the entity in the navigation route. The data integration operation includes retrieving data from a data source according to the relational data model, the selected navigation route, and the selected value for the attribute associated with the entity in the navigation route, and sending the retrieved data to the system in order for the system to integrate the data into the system. In some embodiments, the GUI provides a visual context of data in the relational data model.

In some embodiments, a method receives a selection of a navigation route through a relational data model. The relational data model include several entities and a set of relationships among the several entities. The method also provides, through a graphical user interface (GUI), a tool for qualifying an attribute associated with an entity in the selected navigation route. The method further receives a selection of a value for the attribute associated with the entity in the navigation route for a data integration operation.

In some embodiments, the method also provides, through the GUI, a selectable UI item for invoking the tool for qualifying the attribute associated with the entity in the selected navigation route. The selectable UI item may be provided in response to receiving the selection of the navigation route. The attribute associated with the entity may be a first attribute associated with a first entity and the selectable UI item may be a first selectable UI item. In some embodiments, the method also provides, through the GUI, a second selectable UI item for invoking the tool for qualifying a second attribute associated with a second entity in the selected navigation route.

In some embodiments, the method performs the data integration operation on a system based on the selected navigation route and the selected value for the attribute associated with the entity in the navigation route. The data integration operation may include retrieving data from a data source according to the relational data model, the selected navigation route, and the selected value for the attribute associated with the entity in the navigation route, and sending the retrieved data to the system in order for the system to integrate the data into the system. In some embodiments, the GUI provides a visual context of data in the relational data model.

In some embodiments, a system includes a set of processing units and a non-transitory machine-readable medium storing a program executable by at least one processing unit in the set of processing units. The program receives a selection of a navigation route through a relational data model. The relational data model includes several entities and a set of relationships among the several entities. The program also provides, through a graphical user interface (GUI), a tool for qualifying an attribute associated with an entity in the selected navigation route. The program further receives a selection of a value for the attribute associated with the entity in the navigation route for a data integration operation.

In some embodiments, the program also provides, through the GUI, a selectable UI item for invoking the tool for qualifying the attribute associated with the entity in the selected navigation route. The selectable UI item may be provided in response to receiving the selection of the navigation route. The attribute associated with the entity may be a first attribute associated with a first entity and the selectable UI item may be a first selectable UI item. In some embodiments, the program also provides, through the GUI, a second selectable UI item for invoking the tool for qualifying a second attribute associated with a second entity in the selected navigation route.

In some embodiments, the program performs the data integration operation on a system based on the selected navigation route and the selected value for the attribute associated with the entity in the navigation route. The data integration operation may include retrieving data from a data source according to the relational data model, the selected navigation route, and the selected value for the attribute associated with the entity in the navigation route, and sending the retrieved data to the system in order for the system to integrate the data into the system.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing routes through a relational data model. In some embodiments, a relational data model defines entities and relationships among the entities. Each entity may include one or more attributes and one or more relationships. A relationship between two entities may specify a type of relationship (e.g., a one-to-one relationship, a one-to-many relationship, a many-to-one relationship, a many-to-many relationship, etc.). In some embodiments, a user specifies an entity in the relational data model as a starting entity and an attribute of another entity in the relational data model as a target entity. Based on the starting entity, target entity, and relational data model, several routes through the relational data model are presented to the user for selection. In some embodiments, the routes are presented to the user through a graphical user interface (GUI) in order to provide a visual presentation of the context of data. A route through a relational data model may include a first entity and a second entity that are related to each other according to a one-to-many or many-to-many type of relationship. In some embodiments, the GUI includes a tool for qualifying an attribute associated with the second entity.

Figure 1:
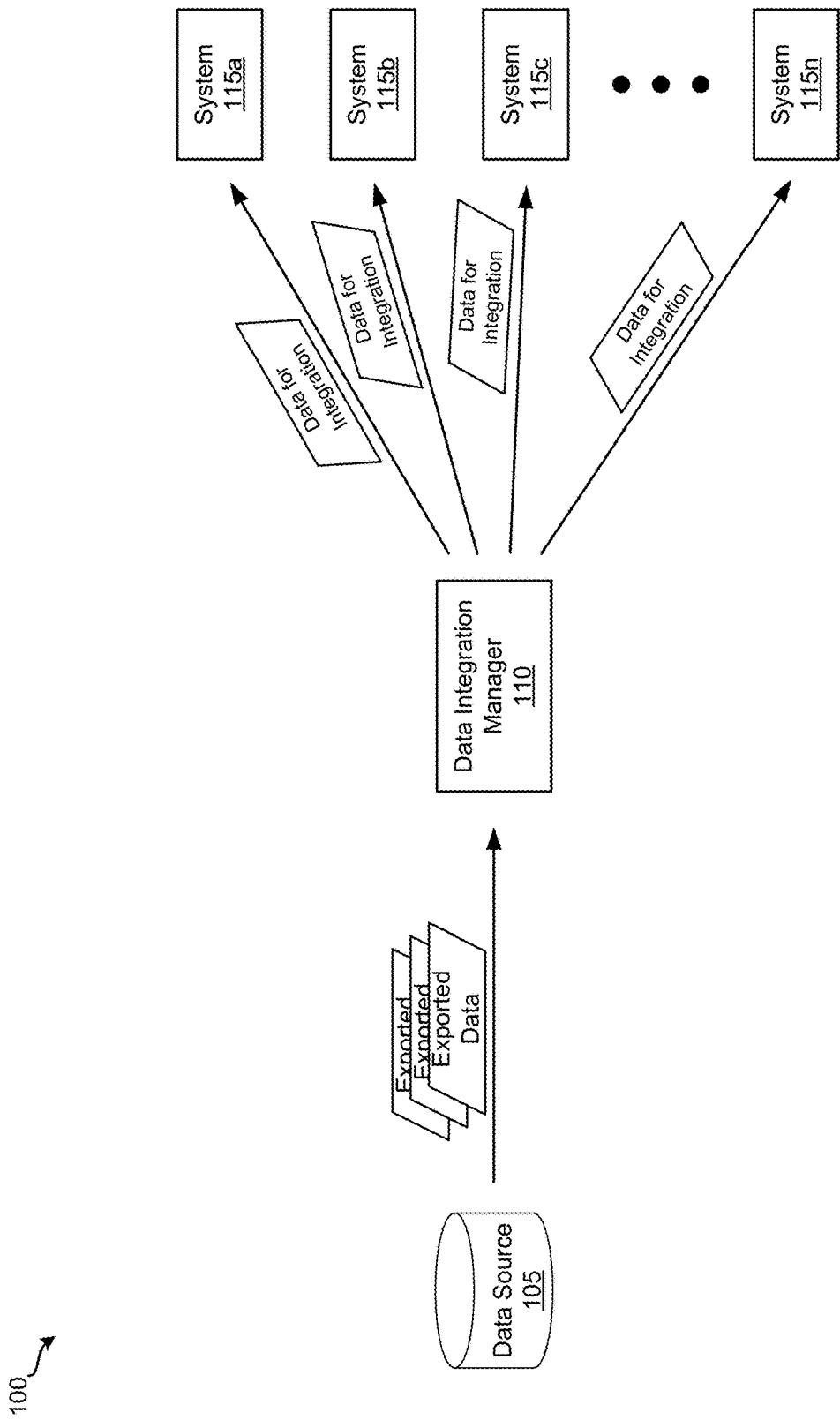
FIG. 1 illustrates a data flow of a system for integrating data according to some embodiments.

FIG. 1 illustrates a data flow of a system 100 for integrating data according to some embodiments. As shown, system 100 includes data source 105, data integration manager 110, and systems 115a-n. In some embodiments, data source 105 and data integration manager 110 are part of the same system while, in other embodiments, data source 105 and data integration manager 110 operate on separate systems.

Data source 105 is configured to provide data to data integration manager 110. In some embodiments, data source 105 stores and manages data based on a relational data model. For example, data source 105 stores data that describes entities defined by the relational data model and data that describes relationships among the entities defined by the relational data model. In some embodiments, data source 105 is implemented by several storages (e.g., hard disk storages, flash memory storages, optical disc storages, etc.) while, in other embodiments, data source 105 is implemented by a single storage. In some embodiments, data source 105 is a database, a file, a data as a service (DaaS), a web service, etc.

Data integration manager 110 may be configured to provide data from data source 105 to systems 115a-n for integration into systems 115a-n. As shown in FIG. 1, data integration manager 110 is receiving exported data from data source 105. In some embodiments, data integration manager 110 retrieves the exported data from data source 105 while, in other embodiments, data source 105 sends the exported data to data integration manager 100 in response to data integration manager 110 sending data source 105 a request for the exported data. Upon receiving the exported data, data integration manager 110 sends the exported data to a system 115 as data for integration into the system 115. In some embodiments, the exported data is sent to a system 115 as a file according to a file format (e.g., a comma-separated values (CSV) file).

In some embodiments, before sending the exported data to a system 115, data integration manager 110 may format the exported data according to a certain format in which the system 115 expects the data. For example, a system 115 may expect to receive address data (e.g., street, city, state, zip code, etc.) as a single string, as a collection of strings and/or numbers, etc. As another example, a system 115 may expect to receive name data (e.g., first name, middle name, last name, etc.) as a single string, as a collection of strings and/or numbers, etc. One of ordinary skill in the art will appreciate that any number of different types of data may be formatted any number of different ways.

Data integration manager 110 may perform data integration operations at different times. For example, data integration manager 110 may perform a data integration operation at a specified time (e.g., a scheduled time), at defined intervals (e.g., once a day, once every five days, once a week, once a month, etc.), in response to a request from a system 115, etc.

In some embodiments, data integration manager 110 is a data integration service or tool that is part of a multi-tenant, cloud-based system implemented using a software as a service (SaaS) methodology. One of ordinary skill in the art will understand that data integration manager 110 may be part of any number of different systems (e.g., a human capital management (HCM) system, an enterprise resource planning (ERP) system, a customer relationship management (CRM) system, a supply chain management (SCM) system, a product lifecycle management (PLM) system, etc.).

Systems 115a-n are configured for receiving data stored in data source 105 via data integration manager 110. In some embodiments, a system 115 may expect data that system 115 receives from data integration manager 110 to be in a certain format (e.g., by sending to data integration manager 110 a request to send data to the system 115 according to the certain format). For example, a system 115 may expect to receive address data (e.g., street, city, state, zip code, etc.) as a single string, as a collection of strings and/or numbers, etc.

Systems 115a-n may be third-party systems that operate on computing systems separate from data source 105 and data integration manager 110. Examples of third-party systems include a payroll system, a background screening system, a finance system, a learning management system (LMS), a human resource management system (HRMS), a human resources information system (HRIS), a time management system, an employee benefits system, etc.

As illustrated in FIG. 1, system 100 includes one data source. One of ordinary skill in the art will realize that system 100 may include any number of additional and/or different data sources from which data integration manager 110 may integrate data into systems 115a-n.

Figure 2:
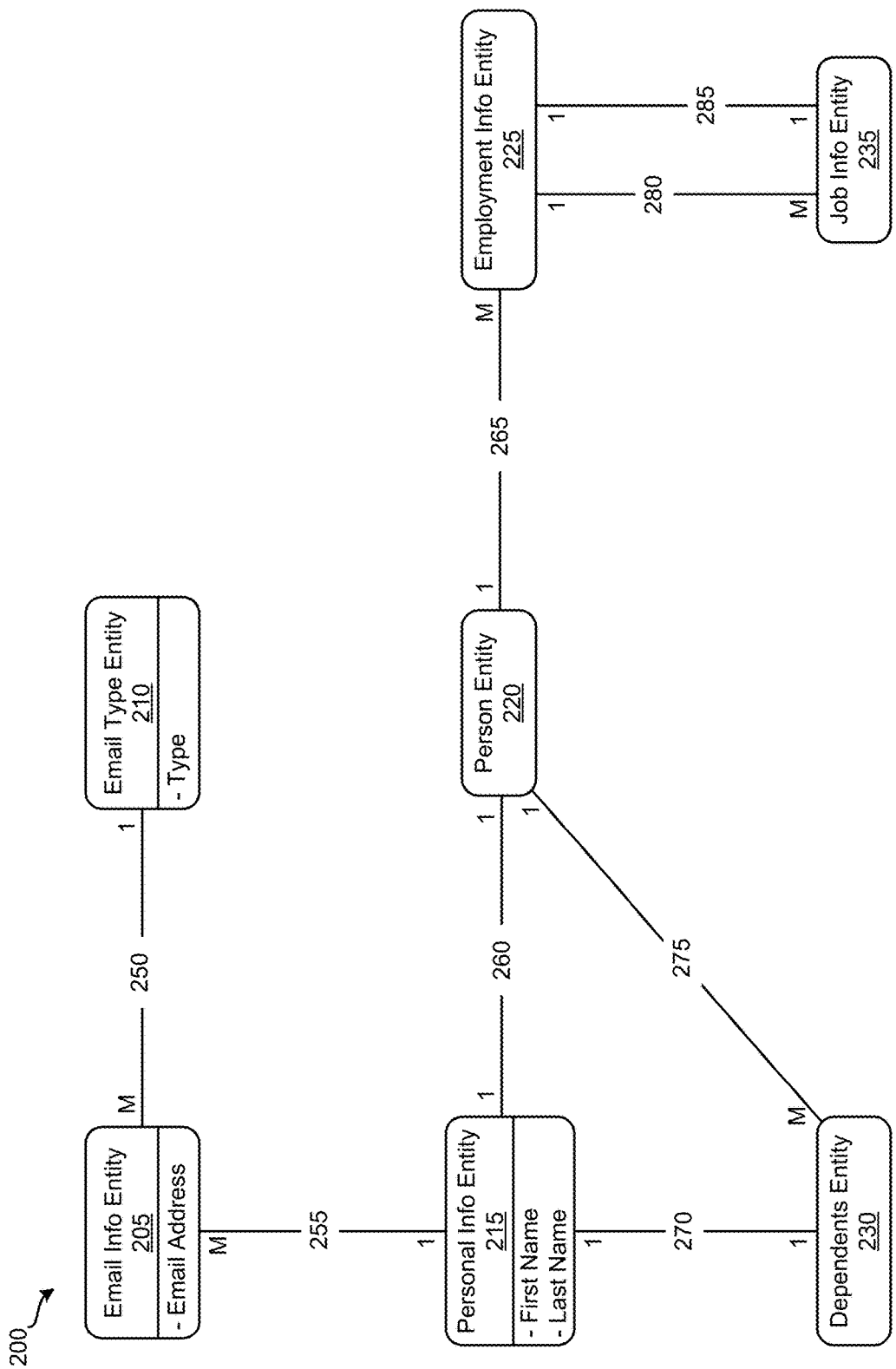
FIG. 2 illustrates an example relational data model according to some embodiments.

As mentioned above, data source 105 may store and manage data based on a relational data model. FIG. 2 illustrates an example relational data model 200 according to some embodiments. In this example, relational data model 200 defines entities and relationships among the entities for describing personal information and employment information associated with people. As described above, a relational data model defines entities and relationships among the entities in some embodiments. Each entity may include one or more attributes and one or more relationships.

As illustrated in FIG. 2, relational data model 200 includes email info entity 205, email type entity 210, personal info entity 215, person entity 220, employment info entity 225, dependents entity 230, and job info entity 235. For this example, email info entity 205 represents information associated with an email, email type entity 210 represents a type of email, personal info entity 215 represents personal information associated with a person, person entity 220 represents a person, employment info entity 225 represents information associated with a place of employment, dependents entity 230 represents a dependent of a person, and job info entity 235 represents information associated with a job. As shown in FIG. 2, personal info entity 215 includes a first name attribute and a last name attribute, email info entity 205 includes an email address attribute, and email type entity 210 includes a type attribute that indicates a type of email address (e.g., personal email, business email, secondary email, etc.). One of ordinary skill in the art will understand that entities 205, 210, 215, 220, 225, 230, and 235 may include any number of additional and/or different attributes. However, for the purposes of simplicity and explanation, attributes of entities 205, 210, 215, 220, 225, 230, and 235 are not shown except for the first name and last name attributes of personal info entity 215, the email address of the email info entity 205, and the type attribute of email type entity 210.

As explained above, a relationship between two entities may specify a type of relationship (e.g., a one-to-one relationship, a one-to-many relationship, a many-to-one relationship, a many-to-many relationship, etc.). FIG. 2 illustrates relationships 250, 255, 260, 265, 270, 275, 280, and 285 among entities 205, 210, 215, 220, 225, 230, and 235. In this example, a person has one or more places of employment, one set of personal information about the person, and one or more dependents. As such, relationship 265 between person entity 220 and employment info entity 225 is a one-to-many relationship with, relationship 260 between person entity 220 and personal info entity 215 is a one-to-one relationship, and relationship 275 between person entity 220 and dependents entity 230 is a one-to-many relationship, respectively.

For a place of employment in this example, a person has one or more jobs at the place of employment. Thus, relationship 280 between employment info entity 225 and job info entity 235 is a one-to-many relationship. In this example, a person has one manager for each job. This relationship is defined in relational data model 200 through relationship 285 between job info entity 235 and employment info entity 225, which is a one-to-one relationship. Specifically, a relationship 285 represents a relationship between the job information of a person and the employment information of the person's manager. In this example, employment information of a manager of a person may be accessed by navigating from job info entity 235 to employment info entity 225 via relationship 285. The personal information of the manager of the person may be accessed by continuing to navigate from employment info entity 225 to personal info entity 215 via relationships 265 and 260.

A dependent in this example has one set of personal information about the dependent. Accordingly, dependent entity 230 has a one-to-one relationship with personal info entity 215. In this example, the personal information for a person has one or more emails. As such, personal info entity 215 has a one-to-many relationship with email info entity 205. Each email in this example may be of a certain type (e.g., personal email, business email, secondary email, etc.) and many emails may be of the same type. Thus, email info entity 205 has a many-to-one relationship with email type entity 210.

As described above, FIG. 2 illustrates an example relational data model. One of ordinary skill in the art will appreciate that the entities, relationships, and types of relationships depicted in FIG. 2 are used for the purposes of simplicity and explanation and that relational data model 200 may include any number of additional and/or different entities, relationships, and/or types of relationships.

Figure 3:
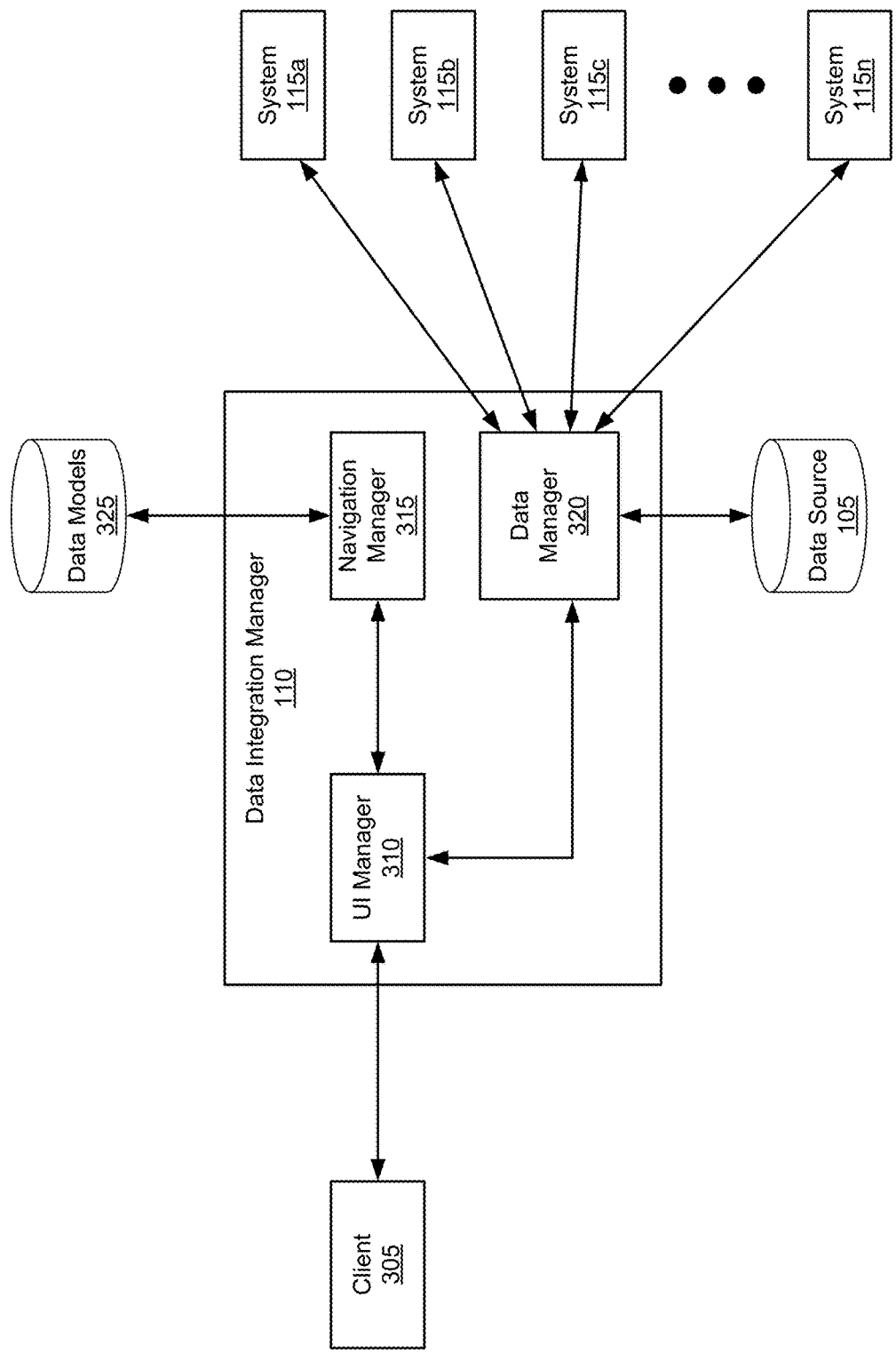
FIG. 3 illustrates an architecture of a data integration manager according to some embodiments.

FIG. 3 illustrates an architecture of data integration manager 110 according to some embodiments. As shown, data integration manager 110 includes a user interface (UI) manager 310, a navigation manager 315, and a data manager 320. UI manager 310 is configured to provide UIs (e.g., GUIs, command line interfaces (CLI), etc.) to client 305 for interacting with the data integration manager 110. Client 305 may be any type of computing device (e.g., a mobile device, a smartphone, a laptop, a desktop computer, a tablet, etc.). Client 305 may include a thin client (e.g., a web browser) configured to interact with the UIs provided by UI manager 310. In some embodiments, client 305 and data integration manager 110 operate on the same computing device while, in other embodiments, client 305 and data integration manager 110 operate on separate computing devices.

Navigation manager 315 is responsible for navigating through a relational data model (e.g., relational data model 200) to identify routes through the relational data model. Navigation manager 315 may receive a request from UI manager 310 to determine routes through a relational data model. In response to such a request, navigation manager 315 may access the relational data model in data models 325, which is configured to store relational data models, in order to determine routes through the relational data model. Upon determining routes through the relation data model, navigation manager 315 sends the determined routes to UI manager 310.

Data manager 320 may handle retrieving data from data source 105 and sending the retrieved data to one or more systems 115 for integration into the one or more systems 115. In some embodiments, before sending the retrieved data to a system 115, data manager 320 may format retrieved data according to a certain format in which the system 115 expects the data. Data manager 320 may receive a request from UI manager 310 to integrate data from data source 105 to one or more systems 115. The request may specify the data for integration, a relational data model, a route through the relational data model to access the data for integration, and one or more systems 115. In response to the request, data manager 320 retrieves the requested data from data source 105 based on the relational data model and the route through the relational data model. Upon retrieving the requested data from data source 105, data manager 320 sends the retrieved data to the specified one or more systems 115.

In some instances, a user of client 305 may want certain data in data source 105 for integration into a system 115. For example, the user may want to integrate the business email of a manager of each person in data source 105 into a system 115. However, a manager may have several different emails associated with the manager. For instance, a manager may have a personal email, a business email, a secondary email, etc. An example data integration operation for integrating the business email of managers by qualifying navigation routes through a relational data model will now be described by reference to FIGS. 2-5.

Figure 4:
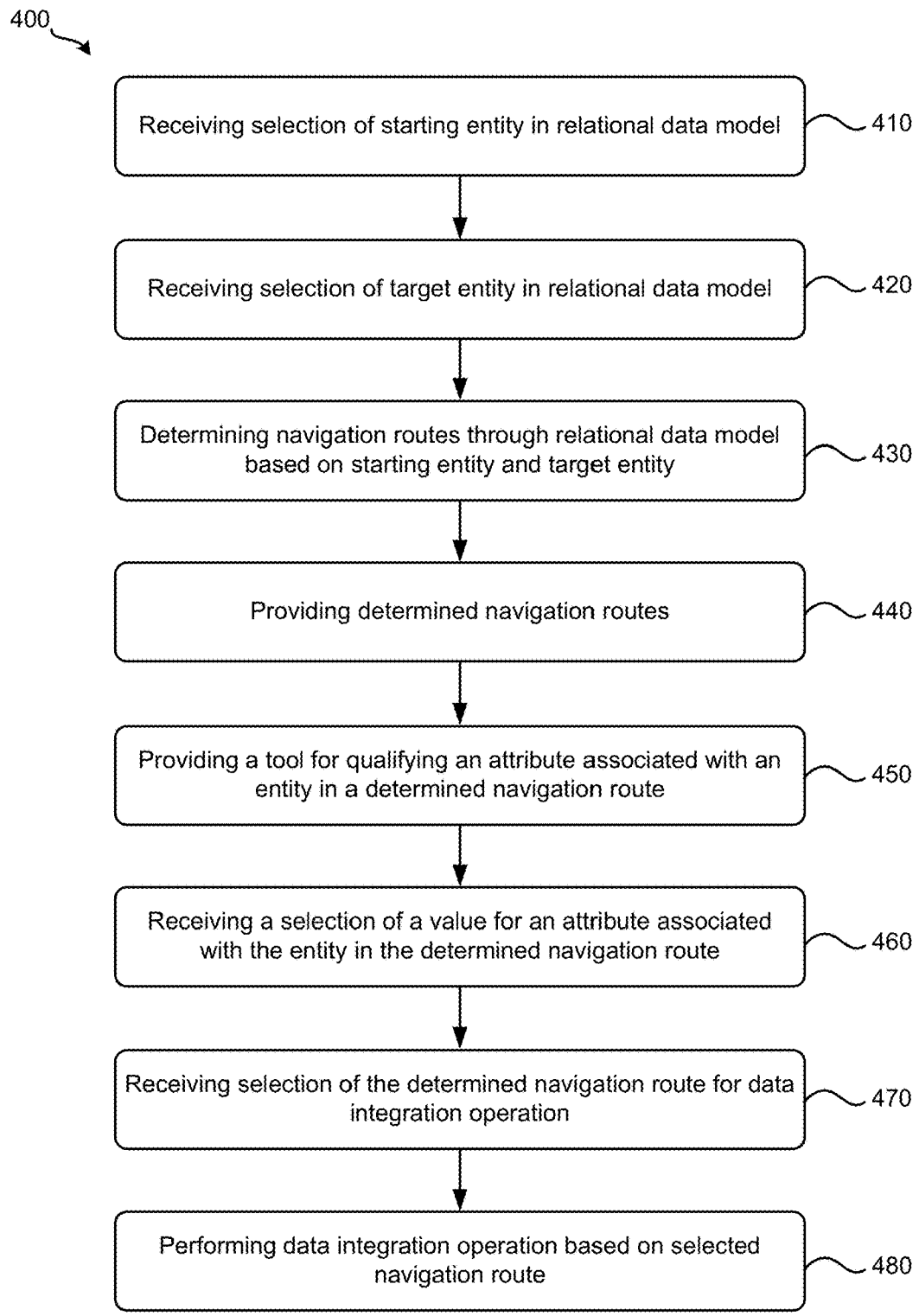
FIG. 4 illustrates a process for qualifying navigation routes through a relational data model according to some embodiments.

FIG. 4 illustrates a process 400 for qualifying navigation routes through a relational data model according to some embodiments. In some embodiments, data integration manager 110 performs process 400. Process 400 starts by receiving, at 410, a selection of a starting entity in a relational data model. Referring to FIG. 3 as an example, UI manager 310 may perform operation 410 by receiving a selection of a starting entity in a relational data model from client 305 through a GUI that UI manager 310 provides to client 305. In this example data integration operation, a user of client 305 selects through the GUI (e.g., via a dropdown menu, a text box control, a selectable UI item, etc.) person entity 220 in relational data model 200 as a starting entity.

Next, process 400 receives, at 420, a selection of a target entity in the relational data model. Referring to FIG. 3 as an example, UI manager 310 may perform operation 420 by receiving a selection of a target entity in the relational data model from client 305 through a GUI that UI manager 310 provides to client 305. In some embodiments, the selection of a target entity includes a selection of one or more attributes of the target entity. For this example data integration operation, a user of client 305 selects through the GUI (e.g., via a dropdown menu, a text box control, a selectable UI item, etc.) the email address attribute of email info entity 205 in relational data model 200 in order to select email info entity 205 as a target entity.

Process 400 then determines, at 430, navigation routes through the relational data model based on the starting entity and the target entity. Referring to FIG. 3 as an example, UI manager 310 may send the selected starting entity and target entity to navigation manager 315 and instruct navigation manager 315 to perform operation 430. After navigation manager 315 determines navigation routes through the relational data model, navigation manager 315 sends the determined navigation routes to UI manage 310.

In some embodiments, process 400 determines a navigation route through the relational data model by beginning at the starting entity in the relational data model, traversing through the relational data model based on the relationships between the entities in the relational data model until arriving at the target entity. The starting entity, the entities through which the relational model is traversed, and the target entity collectively form the navigation route. In some embodiments, process 400 limits the navigation route to a defined number of entities (e.g., five entities, seven entities, ten entities, etc.). Thus, in some such embodiments, process 400 starts determining a new navigation route through the relational data model when process 400 has traversed the defined number of entities in the relational data model and has not arrived at the target entity.

In some embodiments, when process 400 determines a next entity to traverse to when determining a navigation route, process 400 considers an entity in the relational data model other than the previous entity in the navigation route. Referring to FIG. 2 as an example, if process 400 traverses from personal info entity 215 to person entity 220 via relationship 260 for a navigation route, process 400 may consider, as a next entity to traverse to for the navigation route, traversing from person entity 220 to dependents entity 230 via relationship 275 or from person entity 220 to employment info entity 225 via relationship 265. Process 400 does not consider traversing from person entity 220 to personal info entity 215 because process 400 traversed to person entity 220 from personal info entity 215.

Figure 5A:
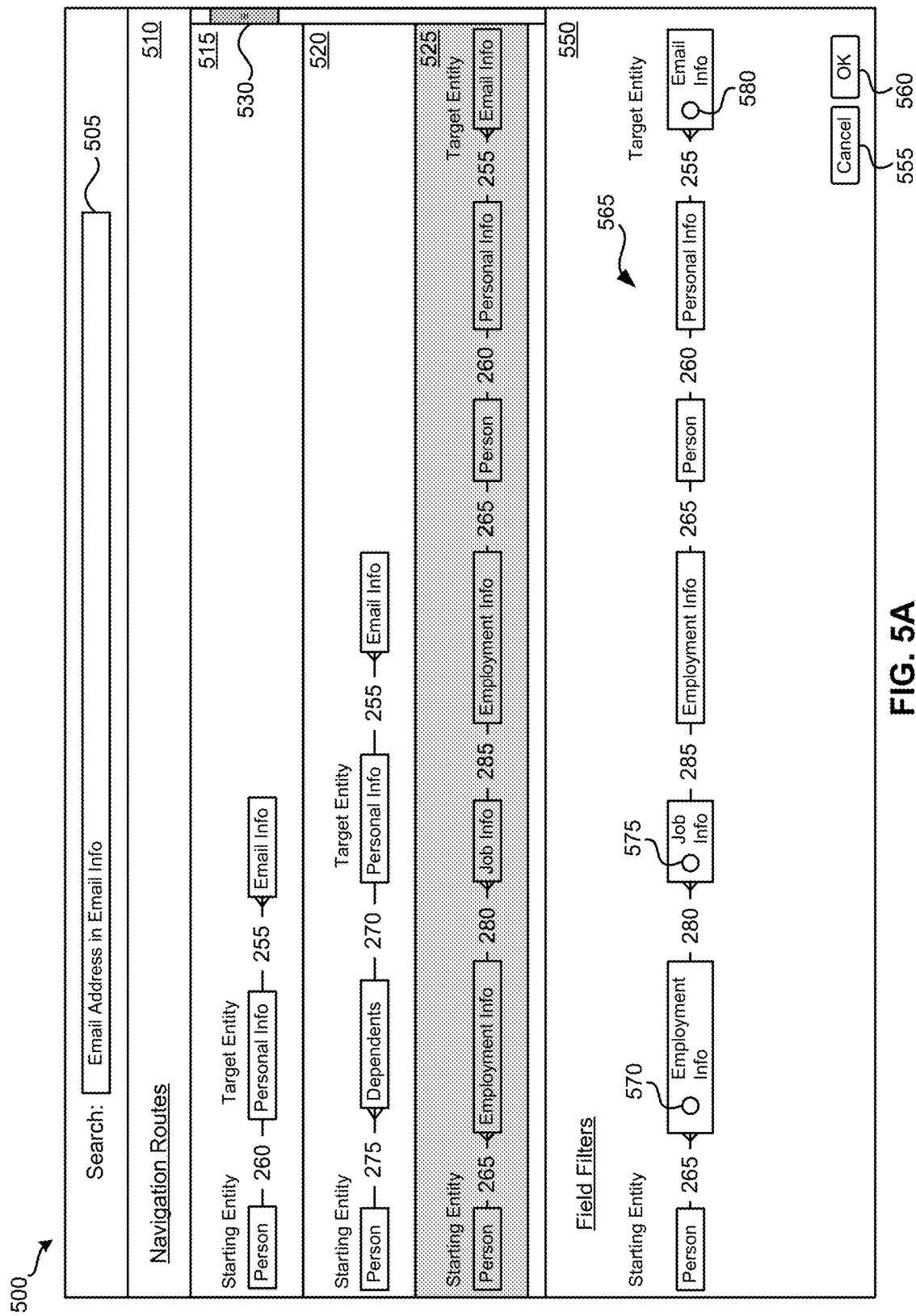
FIGS. 5A and 5B illustrate a graphical user interface (GUI) for providing a tool for qualifying a navigation route through a relational data model according to some embodiments.
Figure 5B:
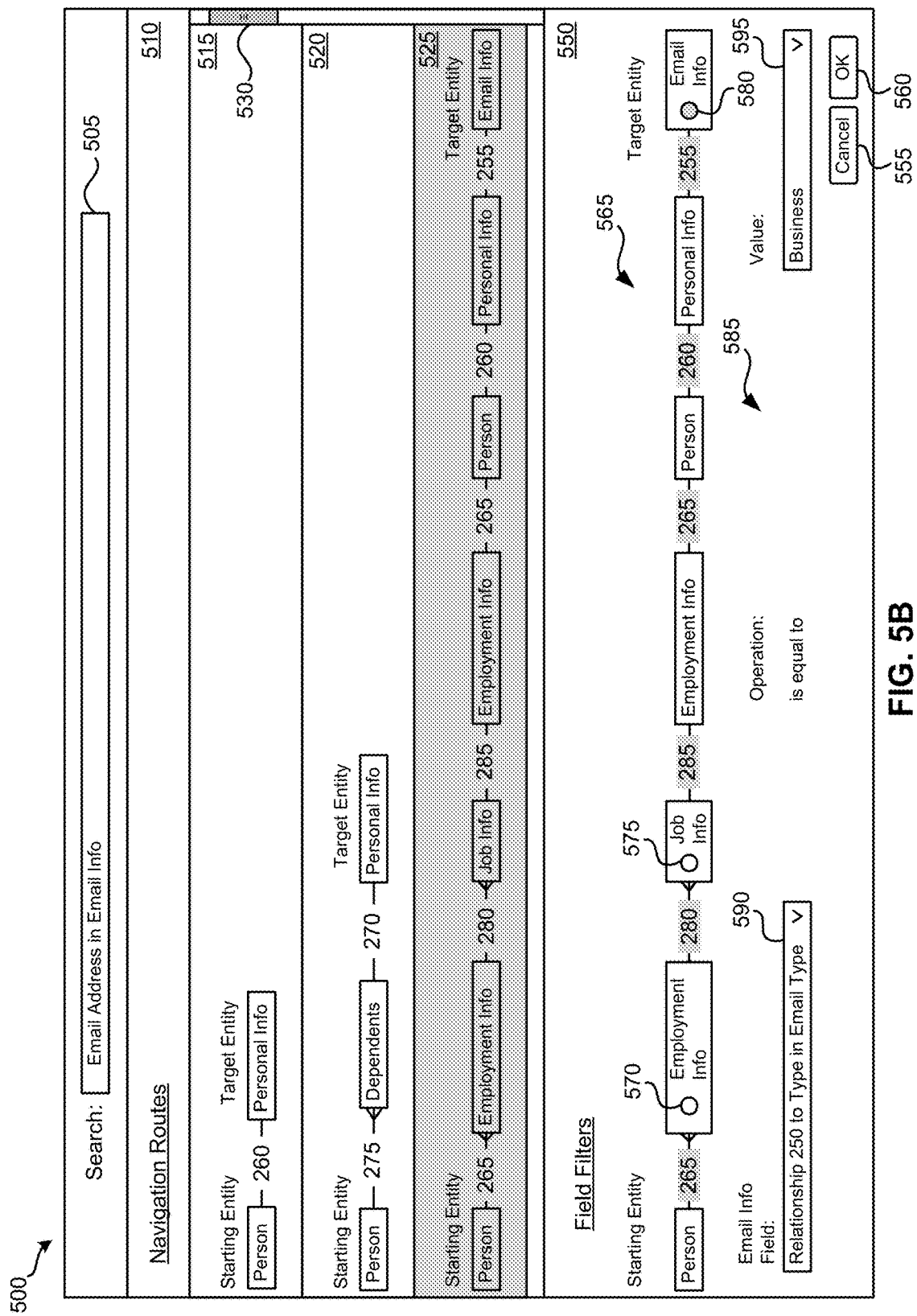

After determining navigation routes through the relational data model, process 400 provides, at 440, the determined navigation routes. Referring to FIG. 3 as an example, UI manager 310 may perform operation 440 by providing the determined navigation routes to client 305 through a GUI that UI manager 310 provides to client 305. Continuing with the example data integration operation, UI manager 310 provides navigation routes that include person entity 220 as the starting entity and email info entity 205 as the target entity. FIGS. 5A and 5B illustrate a graphical user interface (GUI) 500 for providing a tool for qualifying a navigation route through a relational data model according to some embodiments. In particular, GUI 500 provides a tool for qualifying an attribute associated with an entity in a navigation route. For this example data integration operation, UI manager 310 provides such a tool to client 305 via GUI 500. As shown in FIG. 5A, GUI 500 includes text box control 505, navigation route panel 510, field filter panel 550, and selectable UI items 555 and 560.

Text box control 505 receives input for selecting attributes of a target entity in a relational data model. In this example, a user of client 305 specified the email address attribute of email info entity 205 in text box control 505 in order to select the email address as the requested data and email info entity 205 as the target entity. Selectable UI item 555 is configured to terminate the navigation route selection operation and selectable UI item 560 is configured to select a navigation route for a data integration operation.

Navigation route panel 510 is configured to display determined navigation routes through a relational data model. As shown, navigation route panel 510 includes navigation routes 515, 520, and 525. In this example, addition navigation routes are included in navigation route panel 510. The additional navigation routes are not displayed but viewable via scroll bar control 530. Navigation route 515 starts at person entity 220, traverses through personal info entity 215 via relationship 260, and ends at email info entity 205 via relationship 255. As such, traversing through relational data model 200 via navigation route 515 accesses an email address associated with a person. Navigation route 520 starts at person entity 220, traverses through dependents entity 230 and personal info entity 215 via relationships 275 and 270, respectively, and ends at email info entity 205 via relationship 255. Thus, traversing through relational data model 200 via navigation route 520 accesses an email address associated with a dependent of a person. Navigation route 525 starts at person entity 220; traverses through employment info entity 225, job info entity 235, employment info entity 225, and personal info entity 215 via relationships 265, 280, 285, and 260 respectively; and ends at email info entity 205 via relationship 255. Therefore, traversing through relational data model 200 via navigation route 525 accesses an email address of a manager of a person. As illustrated, the navigation routes displayed in navigation route panel 510 provide a visual representation of the context of the requested data (the email address of email info entity 205 in this example).

Field filter panel 550 is configured to display a navigation route that includes a selectable UI item for each entity in the navigation route that belongs to a one-to-many or many-to-many relationship. When GUI 500 receives a selection of a navigation route in navigation route panel 510, GUI 500 displays a version of the selected navigation route in field filter panel 550 includes a selectable UI item for each entity in the navigation route that belongs to a one-to-many or many-to-many relationship.

As shown in FIG. 5A, in this example, navigation route 525 is selected in navigation route panel 510 as indicated by a highlighting of navigation route 525 in navigation route panel 510. As such, field filter panel 550 is displaying navigation route 565. Navigation route 565 is similar to navigation route 525 except navigation route 565 includes selectable UI items 570, 575, and 580. Selectable UI items 570, 575, and 580 are configured to invoke a tool for qualifying an attribute associated with the corresponding entity in navigation route 565. In this example, selectable UI item 570 is configured to invoke a tool for qualifying an attribute associated with employment info entity 225 when traversing from person entity 220 via relationship 265. In addition, selectable UI item 575 is configured to invoke a tool for qualifying an attribute associated with employment info entity 235 when traversing from employment info entity 225 via relationship 280. Selectable UI item 580 is configured to invoke a tool for qualifying an attribute associated with email info entity 205 when traversing from personal info entity 215 via relationship 255.

Returning to FIG. 4, process 400 provides, at 450, a tool for qualifying an attribute associated with an entity in a determined navigation route. Referring to FIG. 3 as an example, UI manager 310 may receive a selection of a UI item to invoke a tool for qualifying an attribute associated with an entity in a determined navigation route from client 305 through GUI 500. In response, UI manager 310 provides in field filter panel 550 a tool for qualifying an attribute associated with an entity in the selected navigation route. In some embodiments, client 305 processes the selection and provides in field filter panel 550 a tool for qualifying an attribute associated with an entity in the selected navigation route in response to the selection.

For this example data integration operation, a user of client 305 selects UI item 580 to invoke a tool for qualifying the type attribute associated with email info entity 205 in navigation route 565 because a person may have more several different types of emails associated with the person. For instance, a person may have a personal email, a business email, or additional and/or different types of emails. A tool for qualifying the type attribute associated with email info entity 205 in navigation route 565 allows the user to specify a particular type of email associated with a person (as opposed to an unknown and/or random type of email associated with the person) for the data integration operation.

FIG. 5B illustrates GUI 500 after UI manager 310 provides UI tool 585 in response to the selection of UI item 580. As shown, UI item 580 is highlighted to indicate that UI tool 585 is for qualifying an attribute associated with email info entity 205. UI tool 585 includes selection controls (e.g., drop-down controls) 590 and 595. Selection control 590 is for selecting an attribute associated with email info entity 205. Selection control 595 is for selecting a value for the attribute selected with selection control 590. UI tool 585 also includes a visual indication of a type of operation between the attribute selected with selection control 590 and the value selected with selection 595. In some embodiments, UI tool 585 may include a selection control (not shown) for selecting the type of operation between the attribute selected with selection control 590 and the value selected with selection 595.

Next, process 400 next receives, at 460, a selection of a value for an attribute associated with the entity in the determined navigation route. Referring to FIG. 3 as an example, UI manager 310 may receive a selection of a value for an attribute associated with the entity in the determined navigation route from client 305 through GUI 500. FIG. 5B also illustrates GUI 500 after UI manager 310 receives a selection of a value for an attribute associated with email info entity 205 in navigation route 565. For this example data integration operation, the requested data is the business email of a manager of a person. Thus, as shown in FIG. 5B, the selected attribute associated with email info entity 205 is the type attribute of email type entity 210 via relationship 250 and the selected value for the type attribute is "Business."

For the purposes of simplicity and explanation, the relationships defined between entities in relational data model 200 are represented in navigation route panel 515 and field filter panel 550 as 260, 275, 265, 280, etc. and the relationship defined between entities in relational data model 200 is represented in UI tool 585 as "relationship 250". One of ordinary skill in the art will realize that GUI 500 may represent such relationships differently in different embodiments. For example, 260 may be represented as "Person to Personal Info Relationship," 285 may be represented as "Job Info to Manager Employment Info Relationship," 275 may be represented as "Person to Dependents Relationship," "relationship 250" may be represented as "Email Info to Email Type Relationship," etc.

Process 400 then receives, at 470, a selection of a determined navigation route for a data integration operation. Referring to FIG. 3 as an example, UI manager 310 may perform operation 470 by receiving a selection of a determined navigation route from client 305 through a GUI that UI manager 310 provides to client 305. In this example data integration operation, after selecting navigation route 525 and qualifying the type attribute associated with email info entity 205 using UI tool 585, a user of client 305 selects UI item 560. In response, UI manager 310 receives the selection of qualified navigation route 565 as a navigation route for a data integration operation from client 305.

Finally, process 400 performs, at 480, the data integration operation based on the selected navigation route. In some embodiments, process 400 may receive a selection of one or more systems on which the data integration operation is performed (e.g., via a GUI provided by UI manager 310 to client 305). In other embodiments, the one or more systems on which the data integration operation is performed is preconfigured.

Referring to FIG. 3 as an example, UI manager 310 may send the selected navigation route and specified systems 115 to data manager 320 and request data manager 320 to perform operation 480. When data manager 320 receives the request, data manager 320 retrieves the requested data based on the navigation route and sends the requested data to the specified systems 115 for integration into the specified systems 115. In this example data integration operation, the requested data is the business email of a manager of a person since the type attribute associated with email info entity 205 of the selected navigation route is qualified as business email. As such, data manager 320 retrieves the business email of a manager of each person in data source 105 and sends such data to the specified systems 115 for integration into the specified systems 115.

Figure 6:
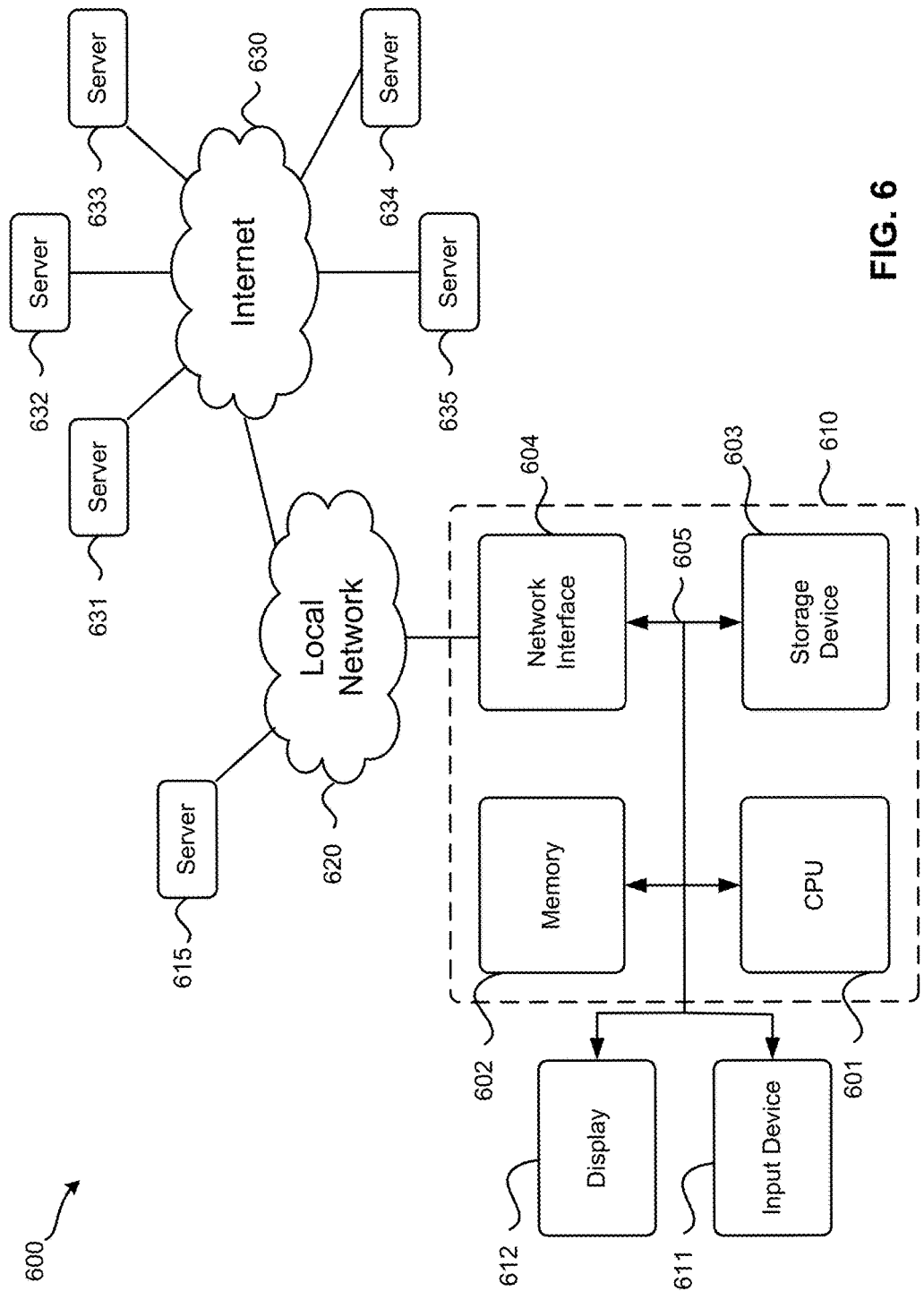
FIG. 6 illustrates an exemplary computer system according to some embodiments.

An exemplary computer system 600 is illustrated in FIG. 6. Computer system 610 includes a bus 605 or other communication mechanism for communicating information, and a processor 601 coupled with bus 605 for processing information. Computer system 610 also includes memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
  receiving, from a client device, a selection of a navigation route through a relational data model, the relational data model defining a plurality of entities and a set of relationships among the plurality of entities, each entity in the plurality of entities comprising a set of attributes, each relationship in the set of relationships specifying a relationship between two entities in the plurality of entities, the navigation route comprising a starting entity that is one of the entities in the defined plurality of entities of the relational data model and an ending entity that is another one of the entities in the defined plurality of entities of the relational data model;
  providing the client device, through a graphical user interface (GUI), a tool for qualifying an attribute associated with an entity in the selected navigation route;
  receiving, from the client device, a selection of a value for the attribute associated with the entity in the navigation route for a data integration operation; and
  performing the data integration operation by:
    retrieving data from a data source operating on a first system, the data source storing a plurality of instances of entities, each instance of an entity in the plurality of instances of entities defined by an entity in the plurality of entities of the relational data model, wherein the data is retrieved from the data source by identifying an instance of an entity in the plurality of instances of entities defined by the starting entity, starting from the instance of the entity defined by the starting entity and traversing the plurality of instances of entities in the data source based on the navigation route and the selected value for the attribute associated with the entity in the navigation route to identify an instance of an entity in the plurality of instances of entities defined by the ending entity, and retrieving a set of values for the set of attributes associated with the instance of the entity defined by the second entity; and
    sending the retrieved data to a second system in order for the second system to integrate the data into the second system.

2. The non-transitory machine-readable medium of claim 1, wherein the program further comprises a set of instructions for providing, through the GUI, a selectable UI item for invoking the tool for qualifying the attribute associated with the entity in the selected navigation route.

3. The non-transitory machine-readable medium of claim 2, wherein the selectable UI item is provided in response to receiving the selection of the navigation route.

4. The non-transitory machine-readable medium of claim 2, wherein the attribute associated with the entity is a first attribute associated with a first entity, wherein the selectable UI item is a first selectable UI item, wherein the program further comprises a set of instructions for providing, through the GUI, a second selectable UI item for invoking the tool for qualifying a second attribute associated with a second entity in the selected navigation route.

5. The non-transitory machine-readable medium of claim 1, wherein the device is part of a human capital management (HCM) system.

6. The non-transitory machine-readable medium of claim 1, wherein performing the data integration operation is further by sending the retrieved data to a third system in order for the third system to integrate the data into the third system.

7. The non-transitory machine-readable medium of claim 1, wherein the GUI provides a visual context of data in the relational data model.

8. A method, executable by a device, comprising:
receiving, from a client device, a selection of a navigation route through a relational data model, the relational data model defining a plurality of entities and a set of relationships among the plurality of entities, each entity in the plurality of entities comprising a set of attributes, each relationship in the set of relationships specifying a relationship between two entities in the plurality of entities, the navigation route comprising a starting entity that is one of the entities in the defined plurality of entities of the relational data model and an ending entity that is another one of the entities in the defined plurality of entities of the relational data model;
providing the client device, through a graphical user interface (GUI), a tool for qualifying an attribute associated with an entity in the selected navigation route;
receiving, from the client device, a selection of a value for the attribute associated with the entity in the navigation route for a data integration operation; and
performing the data integration operation by:
retrieving data from a data source operating on a first system, the data source storing a plurality of instances of entities, each instance of an entity in the plurality of instances of entities defined by an entity in the plurality of entities of the relational data model, wherein the data is retrieved from the data source by identifying an instance of an entity in the plurality of instances of entities defined by the starting entity, starting from the instance of the entity defined by the starting entity and traversing the plurality of instances of entities in the data source based on the navigation route and the selected value for the attribute associated with the entity in the navigation route to identify an instance of an entity in the plurality of instances of entities defined by the ending entity, and retrieving a set of values for the set of attributes associated with the instance of the entity defined by the second entity; and
sending the retrieved data to a second system in order for the second system to integrate the data into the second system.

9. The method of claim 8 further comprising providing, through the GUI, a selectable UI item for invoking the tool for qualifying the attribute associated with the entity in the selected navigation route.

10. The method of claim 9, wherein the selectable UI item is provided in response to receiving the selection of the navigation route.

11. The method of claim 9, wherein the attribute associated with the entity is a first attribute associated with a first entity, wherein the selectable UI item is a first selectable UI item, wherein the method further comprises providing, through the GUI, a second selectable UI item for invoking the tool for qualifying a second attribute associated with a second entity in the selected navigation route.

12. The method of claim 8, wherein the device is part of a human capital management (HCM) system.

13. The method of claim 12, wherein performing the data integration operation is further by sending the retrieved data to a third system in order for the third system to integrate the data into the third system.

14. The method of claim 8, wherein the GUI provides a visual context of data in the relational data model.

15. A first system comprising:
a set of processing units;
a non-transitory machine-readable medium storing a program executable by at least one processing unit in the set of processing units, the program comprising sets of instructions for:
receiving, from a client device, a selection of a navigation route through a relational data model, the relational data model defining a plurality of entities and a set of relationships among the plurality of entities, each entity in the plurality of entities comprising a set of attributes, each relationship in the set of relationships specifying a relationship between two entities in the plurality of entities, the navigation route comprising a starting entity that is one of the entities in the defined plurality of entities of the relational data model and an ending entity that is another one of the entities in the defined plurality of entities of the relational data model;
providing the client device, through a graphical user interface (GUI), a tool for qualifying an attribute associated with an entity in the selected navigation route;
receiving, from the client device, a selection of a value for the attribute associated with the entity in the navigation route for a data integration operation; and
performing the data integration operation by:
retrieving data from a data source operating on a second system, the data source storing a plurality of instances of entities, each instance of an entity in the plurality of instances of entities defined by an entity in the plurality of entities of the relational data model, wherein the data is retrieved from the data source by identifying an instance of an entity in the plurality of instances of entities defined by the starting entity, starting from the instance of the entity defined by the starting entity and traversing the plurality of instances of entities in the data source based on the navigation route and the selected value for the attribute associated with the entity in the navigation route to identify an instance of an entity in the plurality of instances of entities defined by the ending entity, and retrieving a set of values for the set of attributes associated with the instance of the entity defined by the second entity; and
sending the retrieved data to a third system in order for the third system to integrate the data into the third system.

16. The first system of claim 15, wherein the program further comprises a set of instructions for providing, through the GUI, a selectable UI item for invoking the tool for qualifying the attribute associated with the entity in the selected navigation route.

17. The first system of claim 16, wherein the selectable UI item is provided in response to receiving the selection of the navigation route.

18. The first system of claim 16, wherein the attribute associated with the entity is a first attribute associated with a first entity, wherein the selectable UI item is a first selectable UI item, wherein the program further comprises a set of instructions for providing, through the GUI, a second selectable UI item for invoking the tool for qualifying a second attribute associated with a second entity in the selected navigation route.

19. The first system of claim 15, wherein the first system is part of a human capital management (HCM) system.

20. The first system of claim 19, wherein performing the data integration operation is further by sending the retrieved data to a third system in order for the third system to integrate the data into the third system.

* * * * *